United States Patent [19]

MacMillan

[11] 3,787,103

[45] Jan. 22, 1974

[54] UNITARY BUSHING CONSTRUCTION

[75] Inventor: Robert E. MacMillan, Allentown, Pa.

[73] Assignee: McCord Corporation, Detroit, Mich.

[22] Filed: June 26, 1972

[21] Appl. No.: 266,103

[52] U.S. Cl. ................................ 308/26, 308/240
[51] Int. Cl. ............................................ F16c 27/06
[58] Field of Search..... 300/26, 240; 64/19, 27 NM; 15/250.31, 250.34

[56] References Cited
UNITED STATES PATENTS

| 3,215,477 | 11/1965 | Arthur | 308/240 |
| 2,539,072 | 1/1951 | Gordon et al. | 308/240 |
| 2,308,965 | 1/1943 | Riesing | 308/26 |
| 2,515,799 | 7/1950 | Rouy | 308/26 |

FOREIGN PATENTS OR APPLICATIONS

| 948,382 | 2/1964 | Great Britain | 308/26 |
| 1,025,402 | 4/1966 | Great Britain | 308/26 |

Primary Examiner—Charles J. Myhre
Assistant Examiner—Barry Grossman
Attorney, Agent, or Firm—McGlynn and Milton

[57] ABSTRACT

A windshield wiper motion transmitting linkage assembly which includes two links interconnected by a stud. A bushing is supported by one of the links for receiving the stud. The bushing includes a circular attachment means including a groove for receiving the link so as to be attached thereto. The bushing also includes a cylindrical sleeve means having a bore for receiving the stud and an outer surface. There is also included a connection means comprising a web for interconnecting the outer surface of the sleeve means to the connection means whereby the sleeve means is free to cant relative to the attachment means and link.

9 Claims, 5 Drawing Figures

PATENTED JAN 22 1974  3,787,103

UNITARY BUSHING CONSTRUCTION

The instant invention relates to windshield wiper motion transmitting linkage utilized to transmit motion produced by a wiper motor to the wipers which oscillate back and forth across the windshield. During the operation of such linkages the links which are rotatably or pivotally connected together must cant relative to one another. Various sleeve bearings, ball joints, and the like have been utilized to interconnect such links but have been not entirely satisfactory due to cost, wear life, and maintainence.

According, it is an object and feature of this invention to provide a windshield wiper motion transmitting linkage including a link adapted to be connected to another member through a stud and including a bushing supported by the link for receiving the stud with the bushing including attachment means for attachment to the link, sleeve means for receiving the stud, and connection means interconnecting the attachment means and the sleeve means for allowing the sleeve means to cant relative to the attachment means and the link.

In correlation with the foregoing object and feature, it is another object and feature of this invention to provide such a bushing which is a unitary integral member.

In correlation with the foregoing objects and features, it is another object and feature of this invention to provide such a bushing wherein the sleeve means is cylindrical with a bore extending therethrough and an outer surface spaced radially inwardly from the attachment means and wherein the connection means comprises a web extending radially between the outer surface of the sleeve means and the attachment means with the web being sufficiently flexible to allow canting of the sleeve means relative to the attachment means.

Other objects and attendant advantages of the present invention will be readily appreciated as the same becomes better understood by reference to the following detailed description when considered in connection with the accompanying drawings wherein.

Figure 1:
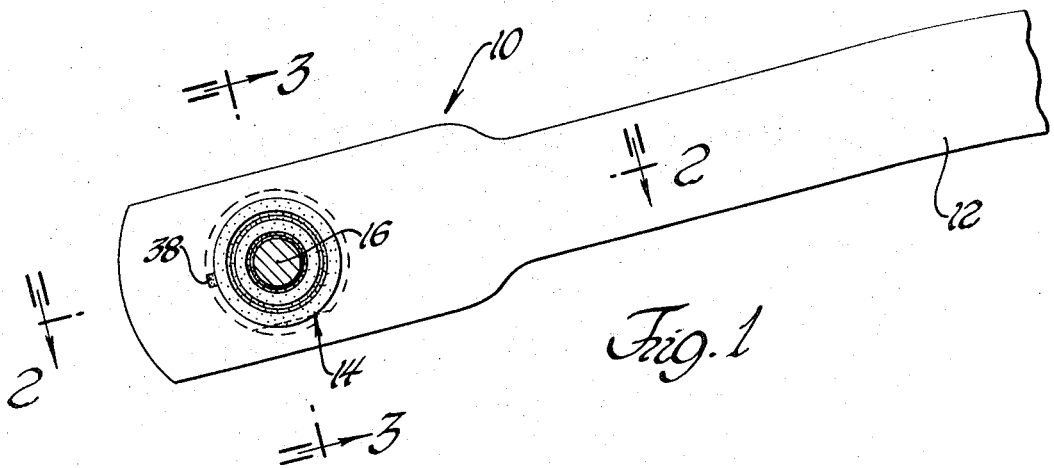
FIG. 1 is a fragmentary plan view showing a link attached to a bushing which is in turn attached to a stud which is in turn connected to another member.
Figure 2:
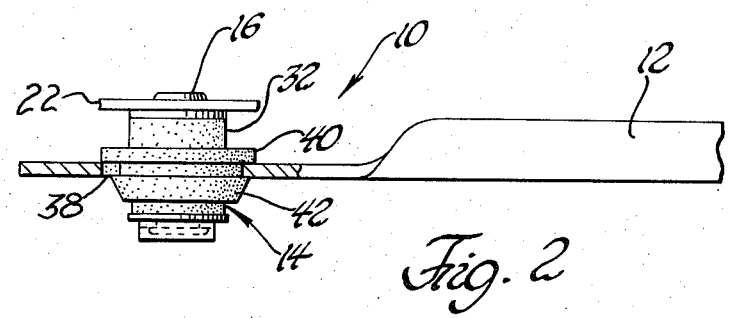
FIG. 2 is a fragmentary cross-sectional view taken substantially along line 2—2 of FIG. 1.
Figure 3:
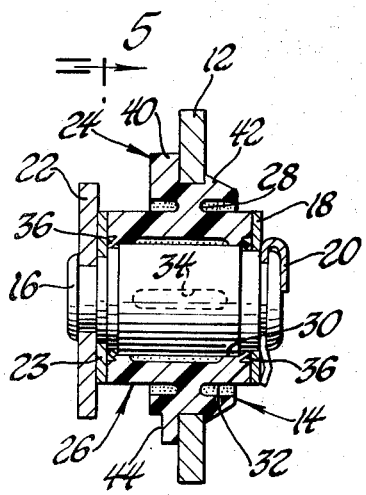
FIG. 3 is a cross-sectional view taken substantially along line 3—3 of FIG. 1.

A windshield wiper motion transmitting linkage assembly constructed in accordance with the instant invention is generally shown at 10. The assembly includes a link 12, a bushing generally indicated at 14, supported by the link 12 and receiving a stud 16.

The stud 16 is retained within the bushing 14 by a washer 18 which is in turn held in place by a clip 20 disposed in a groove in a reduced portion of the stud 16. A link or member 22 is retained on the stud 16 by a flatened head and is spaced from the bushing by washer 23.

Figure 4:
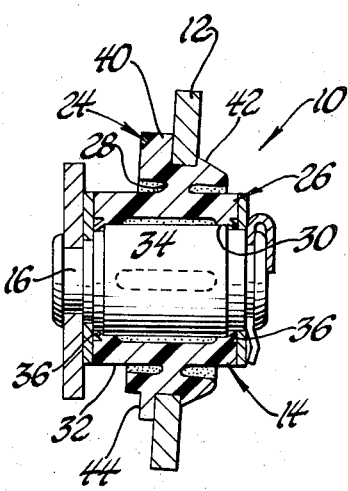
FIG. 4 is a cross-sectional view similar to FIG. 3 but showing the sleeve means canted relative the attachment means and the link.
Figure 5:
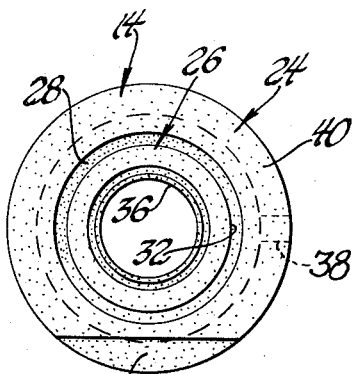
FIG. 5 is an enlarged view taken substantially along line 5—5 of FIG. 3.

Thus, stud 16 is connected to member or link 22 and during operation of the windshield wiper assembly the link 12 must be able to cant relative to the member or link 22, or vice versa, so that the stud 16 may take the position relative to the link 12 as shown in FIG. 4. In order to do this the bushing 14 includes attachment means generally shown at 24 for attaching the bushing 14 to the link 12. There is also included a sleeve means generally indicated at 26 for receiving the stud 16. Further, a connection means comprising the web 28 interconnects the attachment means 24 and the sleeve means 26 to allow the sleeve means 26 to cant relative to the attachment means 24 and the link 12 as shown in FIG. 4.

The bushing 14 is a unitary integral member preferably made of a plastic such as urethane.

The sleeve means 26 is cylindrical or tubular with a bore 30 extending therethrough and an outer surface 32 spaced radially inwardly from the attachment means 24. The web 28 extends radially between the outer surface 32 of the sleeve means 36 and the attachment means 24 and is thin enough to be flexible enough to allow the sleeve means 26 to cant as illustrated in FIG. 4.

The sleeve means 26 includes lubricant retaining means for retaining lubricant in the bore 30 thereof. More specifically, the lubricant retaining means includes grooves 34 which extend axially along the bore 30. As illustrated, there are four such grooves spaced 90° apart about the inside of the bore 30. The grooves 34 perform a wiping action on the stud 16 during relative rotation between the sleeve means 26 and the stud 16. The lubricant retaining means further includes the radially inwardly extending lips 36 disposed at each end of the bore 30.

The attachment means 24 is circular and includes a stop means comprising the tab 38 which engages a notch in the circular aperture in the link 12 to prevent rotation of the bushing 14 relative to the link 12. The attachment means 24 includes a first annular flange 40 and a second tapered annular flange 42 with the flanges 40 and 42 being spaced apart from one another by an annular groove in which the link 12 is disposed. The flange 42 is tapered to facilitate the snapping into engagement of the bushing 14 with the link 12. In other words, the tapered flange 42 allows the bushing 14 to be pushed through the circular aperture in the link 12 until the link 12 is in the annular groove between the flanges 40 and 42.

The tab 38 is disposed in the groove between the flanges 40 and 42 and engages a recess in the link 12 to prevent rotation of the bushing 14 relative thereto.

The bushing also includes a recess 44 in the flange 40 for positioning the bushing 14 prior to assembly with the link 12. In other words, the recess 44 is utilized by an indexing device for properly aligning the tab 38 with the link 12 before inserting the bushing 14 into the aperture in the link 12.

Obviously, many modifications and variations of the present invention are possible in light of the above teachings. It is, therefore, to be understood that within the scope of the appended claims, the invention may be practiced otherwise than as specifically described.

The embodiments of the invention in which as exclusive property or privilege is claimed are defined as follows:

1. A windshield wiper motion transmitting linkage assembly comprising: at least one link; and a bushing supported by said link for receiving a stud which is adapted to connect said link to another member; said bushing including attachment means for attachment to said link, sleeve means for receiving the stud, and connection means for interconnecting said attachment means and said sleeve means for allowing said sleeve means to cant relative to said attachment means and said link; said attachment means including a first annular flange, a second annular flange spaced from said first annular flange to define an annular groove, and stop means disposed between said flanges for preventing rotation between said link and said bushing and for facilitating relative rotation between said bushing and the stud; and said sleeve means including lubricant retaining means including at least one groove extending axially of the stud.

2. An assembly as set forth in claim 1 wherein said bushing is a unitary integral member.

3. An assembly as set forth in claim 2 wherein said bushing is made of plastic.

4. An assembly as set forth in claim 2 wherein said sleeve means is cylindrical with a bore extending therethrough and an outer surface spaced radially inwardly from said attachment means, said connection means comprising a web extending radially between said outer surface of said sleeve means and said attachment means, said web being flexible enough to allow said sleeve means to cant.

5. An assembly as set forth in claim 1 wherein said lubricant retaining means further includes a radially inwardly extending lip at each end of said bore.

6. An assembly as set forth in claim 1 wherein said stop means includes a tab disposed in said groove.

7. An assembly as set forth in claim 1 including a recess in said first annular flange for positioning said bushing prior to assembly with said link.

8. A bushing for disposition about a stud for connecting a link to the stud, said bushing comprising: attachment means for attachment to the link, sleeve means for receiving the stud, and connection means for interconnecting said attachment means and said sleeve means for allowing said sleeve means to cant relative to said attachment means; said attachment means including a first annular flange, a second annular flange spaced from said first annular flange to define an annular groove, and stop means disposed between said flanges for preventing relative rotation between the link and said bushing and for facilitating relative rotation between said bushing and the stud; and said sleeve means including lubricant retaining means including at least one groove extending axially of the stud.

9. A bushing as set forth in claim 8 wherein said sleeve means is cylindrical with a bore extending therethrough and an outer surface spaced radially inwardly from said attachment means, said connection means comprising a web extending radially between said outer surface of said sleeve means and said attachment means, said web being flexible enough to allow said sleeve means to cant.

* * * * *